(12) United States Patent
Zhao et al.

(10) Patent No.: US 9,391,467 B2
(45) Date of Patent: Jul. 12, 2016

(54) STEP-UP BATTERY CHARGING MANAGEMENT SYSTEM AND CONTROL METHOD THEREOF

(71) Applicant: Silergy Semiconductor Technology (Hangzhou) LTD, Hangzhou, ZheJiang Province (CN)

(72) Inventors: Chen Zhao, Hangzhou (CN); Shuai Cheng, Hangzhou (CN); Jie Yao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 275 days.

(21) Appl. No.: 14/158,296

(22) Filed: Jan. 17, 2014

(65) Prior Publication Data

US 2014/0203763 A1 Jul. 24, 2014

(30) Foreign Application Priority Data

Jan. 22, 2013 (CN) .......................... 2013 1 0024894

(51) Int. Cl.
*H02J 7/00* (2006.01)
(52) U.S. Cl.
CPC ............. *H02J 7/0081* (2013.01); *H02J 7/0083* (2013.01); *H02J 7/0093* (2013.01); *H02J 2007/0059* (2013.01)
(58) Field of Classification Search
CPC ..................................................... H02J 7/0029

USPC .......................................................... 320/107
See application file for complete search history.

(56) References Cited

U.S. PATENT DOCUMENTS

| 7,180,268 | B2 | 2/2007 | Denning et al. | |
|---|---|---|---|---|
| 8,503,208 | B2 | 8/2013 | Krause | |
| 8,575,778 | B2 | 11/2013 | Chen | |
| 2006/0267552 | A1* | 11/2006 | Baer et al. | H02J 7/0054 320/128 |
| 2013/0147424 | A1 | 6/2013 | Takano et al. | |

FOREIGN PATENT DOCUMENTS

| CN | 1896762 A | 1/2007 |
|---|---|---|
| CN | 201226449 Y | 4/2009 |
| CN | 101969212 A | 2/2011 |
| CN | 201994705 U | 9/2011 |
| CN | 201210516649.X | 3/2013 |

* cited by examiner

*Primary Examiner* — Thuan Do
(74) *Attorney, Agent, or Firm* — Michael C. Stephens, Jr.

(57) ABSTRACT

In one embodiment, a battery charger can include: (i) a step-up converter configured to generate an output signal by boosting a DC input voltage, where a threshold voltage is greater than the DC input voltage; (ii) a charging control circuit configured to receive the output signal from the step-up converter, and to control charging of a battery; (iii) the charging control circuit being configured to regulate the output signal to maintain a charging current for the battery charging as a trickle current when a battery voltage is less than the threshold voltage; and (iv) the charging control circuit being configured to charge the battery directly by the output signal when the battery voltage is greater than the threshold voltage.

20 Claims, 8 Drawing Sheets

STEP-UP BATTERY CHARGING MANAGEMENT SYSTEM AND CONTROL METHOD THEREOF

RELATED APPLICATIONS

This application claims the benefit of Chinese Patent Application No. 201310024894.3, filed on Jan. 22, 2013, which is incorporated herein by reference in its entirety.

FIELD OF THE INVENTION

The present invention relates to the field of power supplies, and more particularly to a step-up battery charging management system and associated control method.

BACKGROUND

Battery charging systems typically utilize a step-down topology, with an input supplied by a power supply adapter, and an output coupled to a single-cell battery, or multi-cell batteries. A universal serial bus (USB) power supply system usually has a rating power supply voltage of 5V. A single-cell lithium battery can employ such step-down topology to charge the single-cell battery. Step-up topology can be used in battery management systems with series connected multi-cell lithium batteries. However, in some circumstances, such as high input current or short-circuit at the output, if relatively large current is used directly for charging, the electronic device and/or its battery can be damaged.

SUMMARY

In one embodiment, a battery charger can include: (i) a step-up converter configured to generate an output signal by boosting a DC input voltage, where a threshold voltage is greater than the DC input voltage; (ii) a charging control circuit configured to receive the output signal from the step-up converter, and to control charging of a battery; (iii) the charging control circuit being configured to regulate the output signal to maintain a charging current for the battery charging as a trickle current when a battery voltage is less than the threshold voltage; and (iv) the charging control circuit being configured to charge the battery directly by the output signal when the battery voltage is greater than the threshold voltage.

In one embodiment, a method of controlling charging of a battery can include: (i) boosting, by a step-up converter, a DC input voltage to generate an output signal configured to charge a battery; (ii) comparing a battery voltage against a threshold voltage, where the threshold voltage is greater than the DC input voltage; (iii) regulating the output signal to maintain a battery charging current to be a trickle current when the battery voltage is less than the threshold voltage; and (iv) charging the battery directly by the output signal when the battery voltage is greater than the threshold voltage.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In particular embodiments, power stage circuits in a step-up converter for a battery charger or charging management system can utilize a variety of topologies (e.g., Boost, Buck-Boost, Sepic, Cuk, Zeta, etc.). For example, topologies of Boost and Buck-Boost may be simpler, have lower product costs, and have advantages related to the device voltage withstand or breakdown voltage capability and efficiency. However, because there can be a negative voltage at the output of a single-transistor structure Buck-Boost topology, this approach may not be suitable for some battery charger applications. Also, a four-transistor structure Buck-Boost topology may also have disadvantages related to product cost and efficiency in some cases. Therefore, particular embodiments may utilize a Boost converter topology in the battery charger, and a Boost converter is shown in the examples that follow.

In one embodiment, a battery charger can include: (i) a step-up converter configured to generate an output signal by boosting a DC input voltage, where a threshold voltage is greater than the DC input voltage; (ii) a charging control circuit configured to receive the output signal from the step-up converter, and to control charging of a battery; (iii) the charging control circuit being configured to regulate the output signal to maintain a charging current for the battery charging as a trickle current when a battery voltage is less than the threshold voltage; and (iv) the charging control circuit being configured to charge the battery directly by the output signal when the battery voltage is greater than the threshold voltage.

Figure 1:
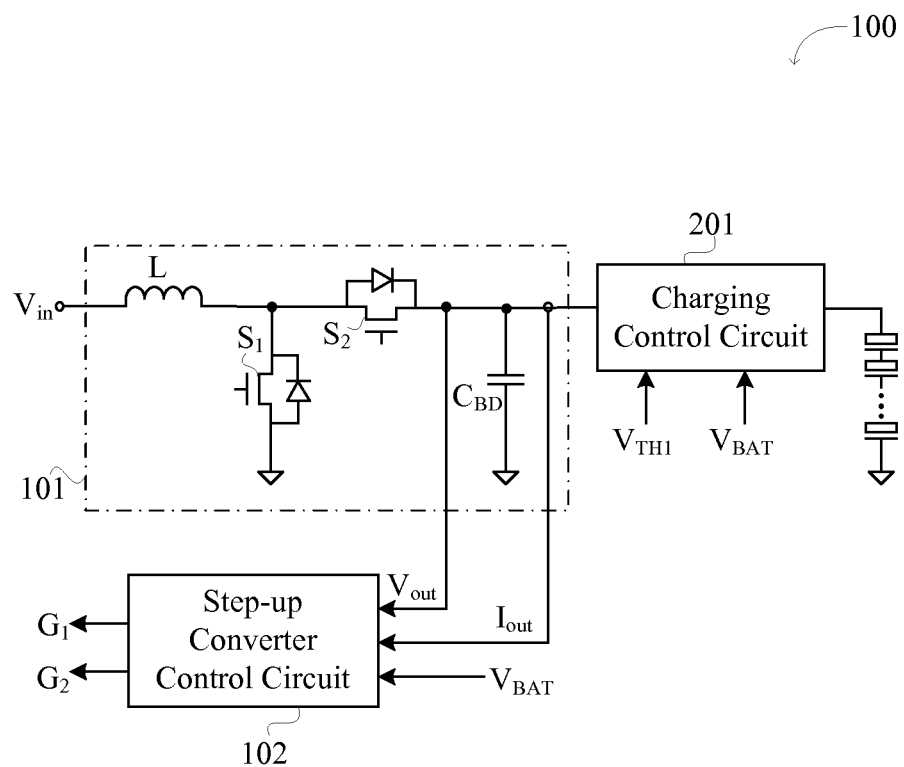
FIG. 1 is a schematic block diagram of a first example step-up battery charger in accordance with embodiments of the present invention.

Referring now to FIG. 1, shown is a schematic block diagram of a first example step-up battery charger or charging management system 100, in accordance with embodiments of the present invention. This example battery charger can include a step-up converter and charging control circuit 201.

The step-up converter can receive DC input voltage $V_{in}$ and may generate an output signal by boosting DC input voltage $V_{in}$. The output signal from the step-up converter can be received by charging control circuit 201, and may be further regulated or controlled for purposes of charging the battery or battery device. The output of charging control circuit 201 can charge a plurality of series connected (e.g., lithium) batteries, as shown. For example, DC input voltage $V_{in}$ can be provided to the step-up converter by a universal serial bus (USB) charger, or any other suitable low voltage power supply system.

For example, power stage circuit 101 of the step-up converter can be a synchronous rectifier Boost topology including inductor L, main switch $S_1$, synchronous switch $S_2$, and output capacitor $C_{BD}$. In a low current application, synchronous switch $S_2$ can be replaced by a diode to lower product costs. Step-up converter control circuit 102 can output control signals $G_1$ and $G_2$ for main switch $S_1$ and synchronous switch $S_2$, respectively. Control signals $G_1$ and $G_2$ can be generated by step-up converter control circuit 102 according to output voltage $V_{out}$, output current $I_{out}$, and battery voltage $V_{BAT}$. In this way, a substantially constant voltage or current control of the output signal of power stage circuit 101 can be realized during different battery charging stages.

Charging control circuit 201 can connect to an output of power stage circuit 101, and may compare battery voltage $V_{BAT}$ against threshold voltage $V_{TH1}$. The output signal of power stage circuit 101 can be regulated or controlled as to its use for battery charging, according to the comparison result. For example, threshold voltage $V_{TH1}$ can be greater than DC input voltage $V_{in}$. When battery voltage $V_{BAT}$ is less than threshold voltage $V_{TH1}$, charging control circuit 201 can regulate, limit, or otherwise restrict the output signal from power stage circuit 101 to charge the battery or battery device with a relatively low "trickle" current. For example, a trickle current can be about 1/10 of a constant charging current. When battery voltage $V_{BAT}$ is greater than threshold voltage $V_{TH1}$, the output signal of power stage circuit 101 can be controlled to directly charge the battery device.

Figure 2:
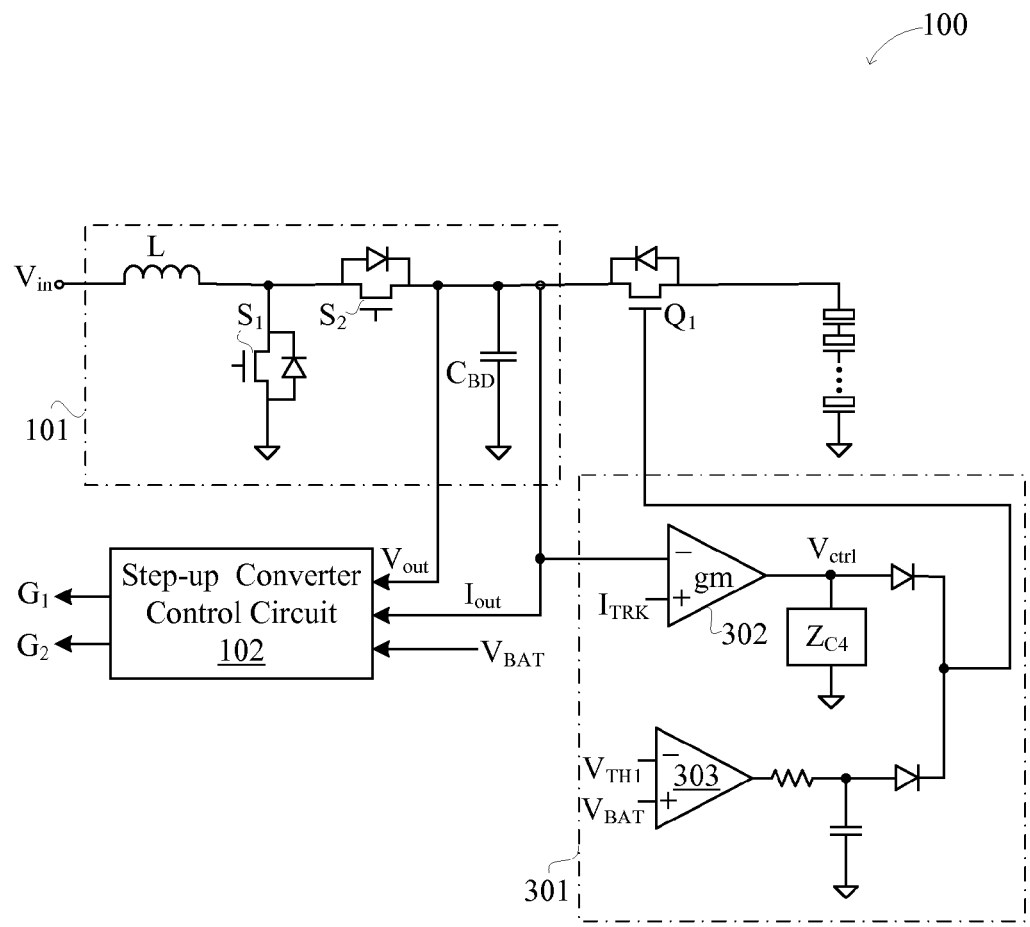
FIG. 2 is a schematic block diagram of a second example step-up battery charger in accordance with embodiments of the present invention.

Referring now to FIG. 2, shown is a schematic block diagram of a second example step-up battery charger or battery charge management system, in accordance with embodiments of the present invention. In this particular example, charging control circuit 201 can include power transistor $Q_1$ and power transistor control circuit 301. During operation of charging control circuit 201, power transistor $Q_1$ can function in a linear region or a fully conductive state (e.g., a saturation region). Power transistor or switch $Q_1$ can be any appropriate power transistor (e.g., BJT, MOS, etc.). In this particular example, transistor $Q_1$ can be an NMOS transistor with its source and drain connected between the output of power stage circuit 101 and the battery device. However, other circuit arrangements, transistors, and/or structures for charging control circuit 201 can also be supported in particular embodiments.

In this example, the non-inverting input terminal of transconductance amplifier 302 in power transistor control circuit 301 can receive signal $I_{TRK}$ that represents an expected value of the trickle current. The inverting input terminal of transconductance amplifier 302 can receive output current $I_{out}$ (e.g., obtained via a current sensor at the output) of power stage circuit 101. The output current of transconductance amplifier 302 can charge/discharge compensation loop $Z_{C4}$ to provide control signal $V_{ctrl}$. Also, the non-inverting input of comparator 303 can receive battery voltage $V_{BAT}$, and the inverting input of comparator 303 can receive threshold voltage $V_{TH1}$. The output of comparator 303 can be converted to a high-low level (e.g., digital, or relatively high amplitude variation) signal through an RC filter circuit.

Control signal $V_{ctrl}$ and the high-low level signal output by comparator 303 can be provided through a diode to the gate of power transistor $Q_1$. For example, the value of the low level signal at the gate of power transistor $Q_1$ can be less than control signal $V_{ctrl}$, and the value of the high level signal can be greater than control signal $V_{ctrl}$. Thus, the higher of the two signals can be used to control the operation state of power transistor $Q_1$. Also, when lithium batteries are connected in series, and no input signal is received by power stage circuit 101, capacitor $C_{BD}$ can be charged by the battery device through the body diode of power transistor $Q_1$. Thus in this case, output voltage $V_{out}$ can be relatively close to battery voltage $V_{BAT}$.

When an input signal is provided to power stage circuit 101, and if DC input voltage $V_{in}$ is greater than battery voltage $V_{BAT}$, capacitor $C_{BD}$ can be charged through the body diode of synchronous switch $S_2$ until reaching the level of DC input voltage $V_{in}$. Battery voltage $V_{BAT}$ may be less than output voltage $V_{out}$ (e.g., battery voltage $V_{BAT}$ is less than threshold voltage $V_{TH1}$), and comparator 303 can output a low level signal. Thus, control signal $V_{ctrl}$ can be used to regulate the gate voltage of power transistor $Q_1$ such that power transistor $Q_1$ operates in the linear region, and the battery device can be charged with a trickle current in a closed loop. Step-up converter control circuit 102 can also control output voltage $V_{out}$ to be slightly greater than a predetermined operating voltage of $V_{in}$ in the closed loop. For example, the predetermined operating voltage can be slightly greater than threshold voltage $V_{TH1}$ (e.g., if DC input voltage is about 5V, $V_{TH1}$ can be about 5.4V or about 5.3V, and the predetermined operating voltage can be about 5.8V).

When battery voltage $V_{BAT}$ is greater than threshold voltage $V_{TH1}$, comparator 303 can output a high level signal to fully turn on power transistor $Q_1$. In this case, the output signal of power stage circuit 101 can directly charge the battery device. When battery voltage $V_{BAT}$ is greater than threshold voltage $V_{TH1}$ but less than final voltage $V_{CV}$ (e.g., final voltage $V_{CV}$ can be about 8.4V if two lithium batteries are connected in series), step-up converter control circuit 102 can maintain output current $I_{out}$ at a predetermined operating current (e.g., when the predetermined operating current is about 2 A, the corresponding trickle current can be about 200 mA), so as to charge the battery device with a substantially constant current.

When battery voltage $V_{BAT}$ equals a level of final voltage $V_{CV}$, step-up converter control circuit 102 can control output voltage $V_{out}$ to be equal to final voltage $V_{CV}$ through the closed loop. In this way, the battery device can be charged with a substantially constant voltage. Note that the error between the output voltage and the battery voltage caused by the voltage drop of power transistor $Q_1$ can generally be ignored; however, output voltage $V_{out}$ can be controlled to be slightly greater than the final voltage if considering the error). The substantially constant charging voltage can remain until the battery charging current is less than a shutdown current threshold value (e.g., about 100 mA, or less than about 100 mA). Step-up converter control circuit 102 can first turn off main switch $S_1$ to prevent inductor current in power stage circuit 101 from rising. When the inductor current is reduced to zero, synchronous switch $S_2$ and power transistor $Q_1$ can then be turned off (e.g., simultaneously) to complete the battery charging procedure.

To avoid power consumption due to current leakage from the battery device to the input of the step-up converter, synchronous switch $S_2$ and power transistor $Q_1$ can be turned off after the inductor current is reduced to zero. Similarly, if other protection responses occur besides the output short-circuit protection during charging (e.g., input overvoltage, output overvoltage, too slow, overtime, etc.), main switch $S_1$ may be turned off immediately. Further, the inductor current is reduced to zero, synchronous switch $S_2$ and power transistor $Q_1$ may be turned off (e.g., simultaneously).

Figure 3:
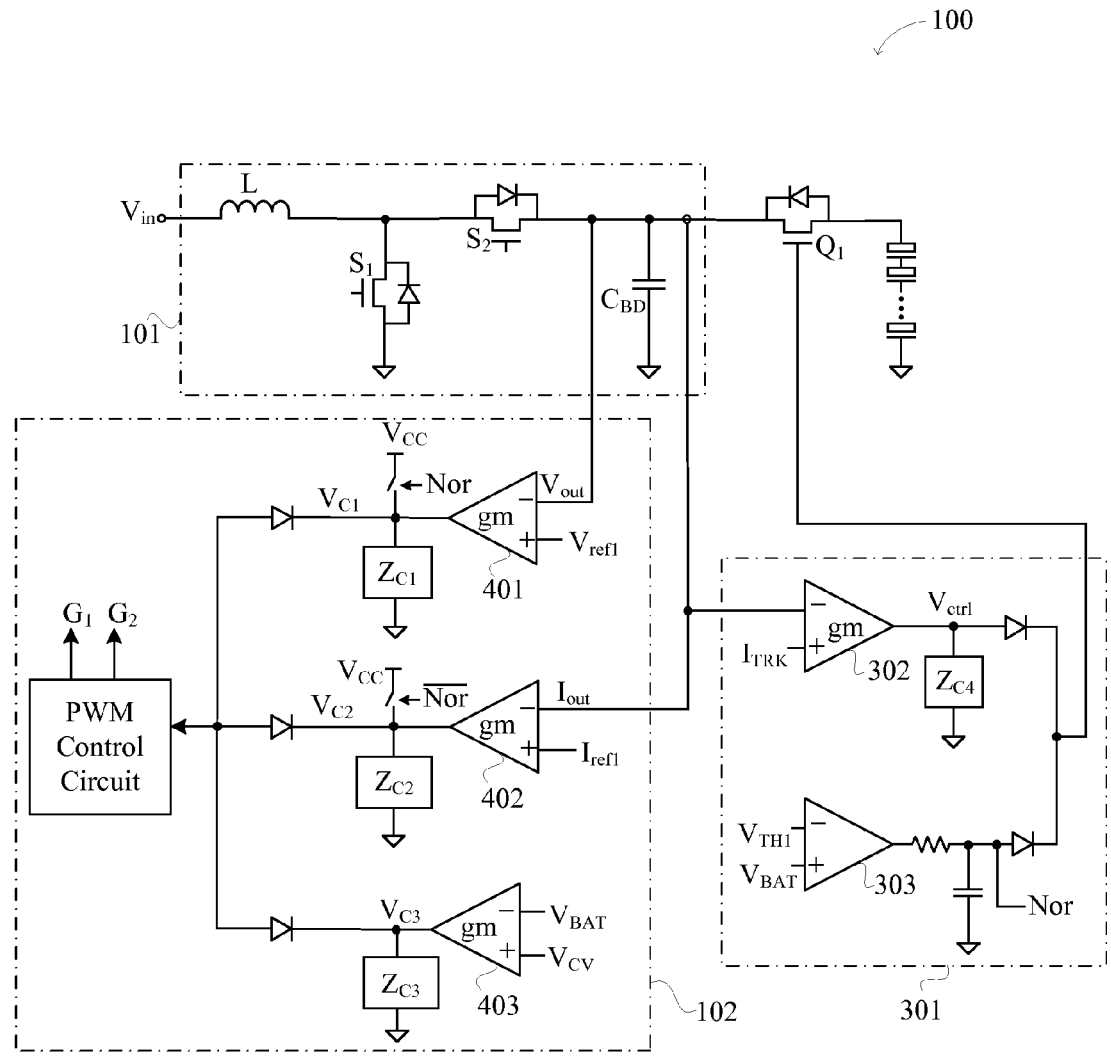
FIG. 3 is a schematic block diagram of a third example step-up battery charger in accordance with embodiments of the present invention.

Referring now to FIG. 3, shown is a schematic block diagram of a third example step-up battery charger in accordance with embodiments of the present invention. In order to realize natural switching between constant voltage control and constant current control of the step-up converter, FIG. 3 shows a specific block diagram of an example step-up converter control circuit 102 based on the example shown in FIG. 2. In this example, step-up converter control circuit 102 can include first, second, and third feedback circuits, a select circuit, and a pulse-width modulation (PWM) control circuit. The first feedback circuit can include transconductance amplifier 401 and compensation loop $Z_{C1}$, and may generate feedback signal $V_{C1}$ according to an error between output voltage $V_{out}$ and predetermined operating voltage $V_{ref1}$.

The second feedback circuit can include transconductance amplifier 402 and compensation loop $Z_{C2}$, and may generate feedback signal $V_{C2}$ according to an error between output current $I_{out}$ and predetermined operating current $I_{ref1}$. The third feedback circuit can include transconductance amplifier 403 and compensation loop $Z_{C3}$, and may generate feedback signal $V_{C3}$ according to an error between battery voltage $V_{BAT}$ and final voltage $V_{CV}$. These feedback signals can be provided to a select circuit that includes three diodes, and the lowest level signal of these feedback signals may be output to the PWM control circuit. For example, the PWM control circuit can be used to output switch control signals $G_1$ (for main switch $S_1$) and $G_2$ (for synchronous switch $S_2$).

When battery voltage $V_{BAT}$ is less than threshold voltage $V_{TH1}$, the battery charging current can be far less than predetermined operating current $I_{ref1}$ due to being regulated to be the trickle current. Further, battery voltage $V_{BAT}$ can be far less than final voltage $V_{CV}$, so feedback signals $V_{C2}$ and $V_{C3}$ can be relatively high. Thus, feedback signal $V_{C1}$ can be provided to the PWM control circuit, so as to maintain the output voltage at predetermined operation voltage $V_{ref1}$. When battery voltage $V_{BAT}$ is greater than threshold voltage $V_{TH1}$ but less than $V_{CV}$, output voltage $V_{out}$ may be pulled down instantly, so feedback signal $V_{C1}$ may be pulled up instantly. However, as battery voltage $V_{BAT}$ may remain less than final voltage $V_{CV}$, feedback signal $V_{C3}$ can be greater feedback signal $V_{C2}$, and feedback signal $V_{C2}$ can be provided to the PWM control circuit to maintain the output current at predetermined operating current $I_{ref1}$ to charge the battery device with a constant current.

When battery voltage $V_{BAT}$ equals final voltage $V_{CV}$, feedback signal $V_{C3}$ may become the lowest, and thus be provided to the PWM control circuit to charge the battery device with a constant voltage. Then, the battery charging current may begin to reduce, and when the battery charging current is less than the shutdown current threshold value, the charging procedure can be completed. The select circuit in step-up converter control circuit 102 can thus choose different feedback signals for controlling power stage circuit 101, in order to realize natural switching from an initial charging state to different charging modes (e.g., constant current charging, constant voltage charging, etc.).

When step-up converter control circuit 102 changes from a constant voltage operation state to a constant current operation state, as the output voltage of power stage circuit 101 may drop instantly, feedback signal $V_{C1}$ can again be the lowest feedback signal. As a result, the entire step-up converter may not successfully transition to a constant current operation state. For this particular case, "shield" signal "Nor" can be utilized. When battery voltage $V_{BAT}$ is less than threshold voltage $V_{TH1}$, shield signal Nor can be inactive, and an inverted version of signal Nor can control the output of transconductance amplifier 402 to connect with input power supply $V_{CC}$ to pull up feedback signal $V_{C2}$. When battery voltage $V_{BAT}$ is greater than threshold voltage $V_{TH1}$, shield signal Nor can be active to control the output of transconductance amplifier 401 to connect with input power supply $V_{CC}$ directly to pull up feedback signal $V_{C1}$. In some applications, the output of comparator 303 can be converted to be a high-low (e.g., digital) level signal as shield signal Nor after being filtered by the RC filter.

A compensation loop (e.g., $Z_{C1}$, $Z_{C2}$, $Z_{C3}$ and $Z_{C4}$) connected with an output of a transconductance amplifier can include a capacitor or series connected capacitor and resistor, or any other suitable circuit structure. In particular embodiments, a step-up battery charger or charging management system can control the battery charging current to be a trickle current at an initial charging state by controlling switching operation of power transistor $Q_1$ in charging control circuit 201. When the battery voltage reaches the threshold voltage value, the step-up battery charging management system can control the output signal of the step-up converter to directly charge the battery device with a constant current and/or a constant voltage.

When the battery device is abnormally connected to the charger or system, and the output of the step-up converter is connected to an energy-consuming load, the system can still function normally in a step-up circuit mode. In this case, input power supply $V_{in}$ can be greater than an under-voltage lockout threshold value, power transistor $Q_1$ in charging control circuit 201 can gradually be turned on to limit the surge current, and the step-up converter may operate in a constant voltage/constant current mode. However, in some cases, when the battery voltage is too low, a high charging current may damage the electronic device. Also, during constant current charging, too low of an input power supply may cause reduction of the input voltage.

Figure 4:
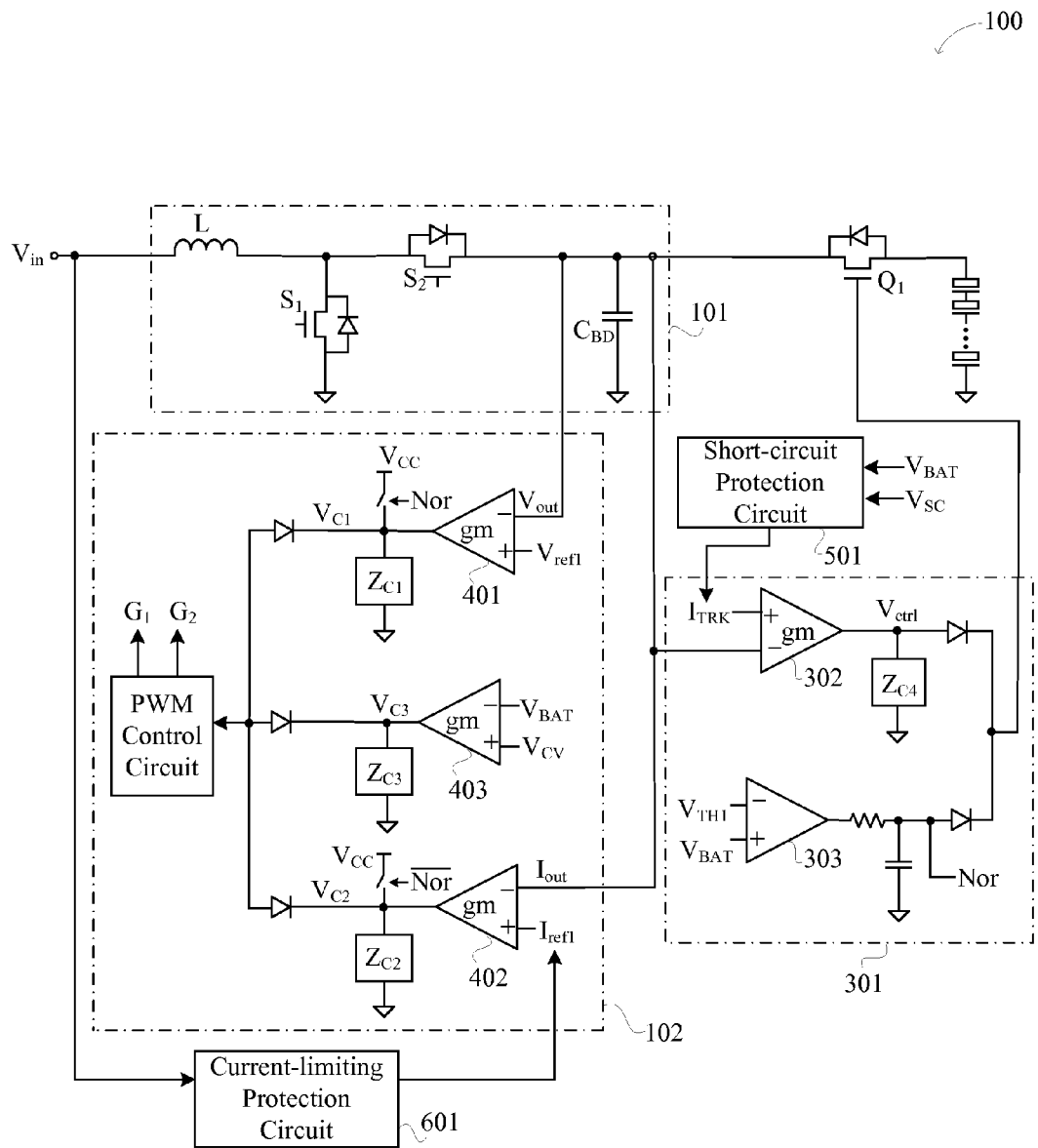
FIG. 4 is a schematic block diagram of a fourth example step-up battery charger in accordance with embodiments of the present invention.

Referring now to FIG. 4, shown is a schematic block diagram of a fourth example step-up battery charger, in accordance with embodiments of the present invention. In this example, short-circuit protection circuit 501 and current-limiting protection circuit 601 can be added to the example shown in FIG. 3. Short circuit protection circuit 501 can receive battery voltage $V_{BAT}$ and short-circuit protection threshold value $V_{SC}$. During an initial battery charging stage, battery voltage $V_{BAT}$ can be less than short-circuit protection threshold value $V_{SC}$, and the circuit may start to output a short-circuit protection response. If the battery device is connected normally, main switch $S_1$ can be turned off first, and power transistor $Q_1$ may operate in the linear region. Short-circuit protection circuit 501 can control the battery charging current to be a predetermined current value that is less than the trickle current (e.g., for two series connected lithium batteries, $V_{sc}$ can be about 2V, the trickle current can be about 200 mA, and the predetermined current value can be about 100 mA). In this example, the output signal of short-circuit protection circuit 501 can be used to reduce the reference value at the non-inverting input of transconductance amplifier 302 such that the reference value can represent the predetermined current value.

Current-limiting protection circuit 601 can connect to the input of power stage circuit 101, and DC input voltage $V_{in}$ can be compared against a current limiting voltage threshold value. When DC input voltage is less than the current limiting voltage threshold value, current-limiting protection circuit 601 can limit the battery charging current so as to limit the input current of the step-up converter. The output signal of current-limiting protection circuit 601 can be used to reduce the charging current reference signal at the non-inverting input of transconductance amplifier 402 (see, e.g., a current-limiting protection circuit in Chinese Patent Application CN 201210516649.X).

Figure 5:
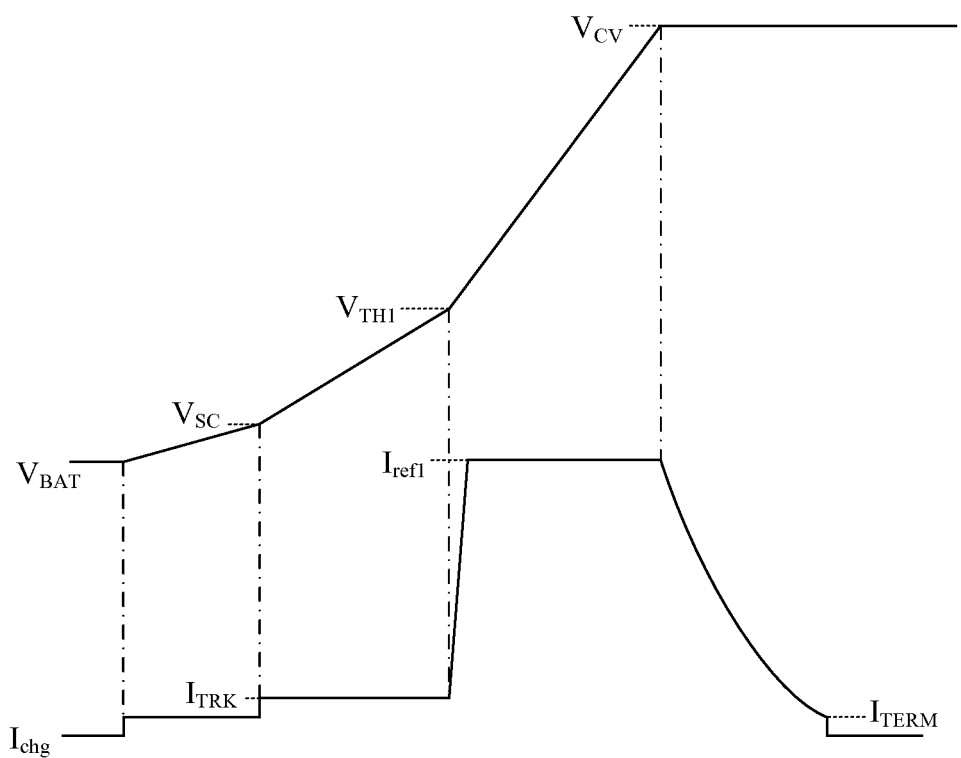
FIG. 5 is a waveform diagram of the example step-up battery charger as shown in FIG. 4, in accordance with embodiments of the present invention.

Referring now to FIG. 5, shown is a waveform diagram of the example step-up battery charger as shown in FIG. 4, in accordance with embodiments of the present invention. With the current-limiting protection circuit and short-circuit protection circuit, when the battery voltage is too low, the charging current can be controlled to be lowered to effectively protect the electronic device (e.g., including the battery charger) and the battery device (e.g., a battery, series connected batteries, another load, etc.).

In some cases of abnormal battery connection to the charger or battery charging management system, if the battery device is replaced by an energy-consuming load (e.g., a resistor), main switch $S_1$ may be turned off first. Once the load voltage is less than threshold voltage $V_{TH1}$, power transistor control circuit 301 may control power transistor $Q_1$ to operate in the linear region to supply power for the load with a relatively low trickle current. Since the voltage of the energy-consuming load may not rise as slowly as the charging battery, once power transistor $Q_1$ enters the linear region, it may be difficult to change to a normal constant current or constant voltage operation state, and the battery charging current may be controlled as a discontinuous current.

Figure 6:
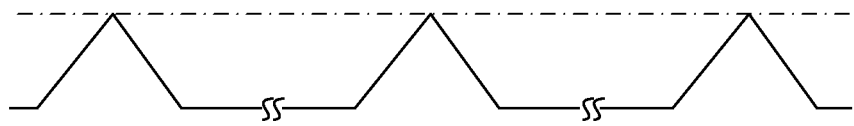
FIG. 6 is an expected waveform diagram of a battery charging current when the battery connection is abnormal.

In power transistor control circuit 301, a waveform of the charging current reference signal received at the non-inverting input of transconductance amplifier 302 can be a discontinuous triangular wave, as shown in FIG. 6. The peak value of the triangular wave can be greater than the corresponding load current when the output signal is threshold voltage $V_{TH1}$. Thus, when the battery charging current is controlled to be greater than the corresponding load current, the load voltage can be greater than threshold voltage $V_{TH1}$. Then, power transistor $Q_1$ may be turned on fully, and the output signal of the step-up converter can be used to supply power for the load. Of course, the waveform of the charging current reference signal may not be limited to the discontinuous triangular wave shown. Rather, other discontinuous waveforms (e.g., discontinuous sine half wave, discontinuous square wave, etc.) can also be utilized in particular embodiments.

Figure 7:
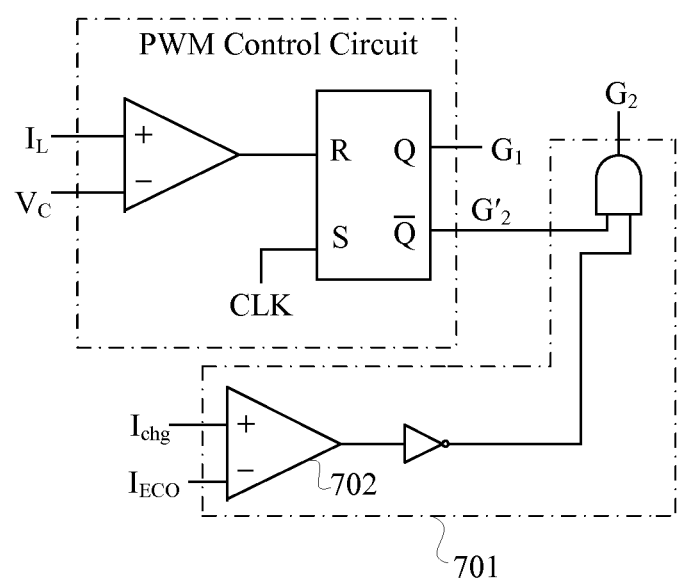
FIG. 7 is a schematic block diagram of a PWM control circuit and an energy-saving control circuit, in accordance with embodiments of the present invention.

Various control methods (e.g., peak current control, constant on time control, constant off time control, current hysteresis control, etc.) can be employed in particular embodiments. Referring now to FIG. 7, shown is a schematic block diagram of a PWM control circuit with peak current control, in accordance with embodiments of the present invention. In this example, energy-saving control circuit 701 is included. Energy-saving control circuit 701 can utilize comparator 702 to receive battery charging current $I_{chg}$ and energy-saving mode current threshold value $I_{ECO}$. When battery charging current $I_{chg}$ is lower than energy-saving mode current threshold value $I_{ECO}$, the step-up battery charger can enter into an energy-saving mode. In this mode, the output of comparator 702 can turn off synchronous switch $S_2$ by a logic operation, and the synchronous rectifier step-up converter may operate in a non-synchronous state to lower switching losses and improve conversion efficiency.

In one embodiment, a method of controlling charging of a battery can include: (i) boosting, by a step-up converter, a DC input voltage to generate an output signal configured to charge a battery; (ii) comparing a battery voltage against a threshold voltage, where the threshold voltage is greater than the DC input voltage; (iii) regulating the output signal to maintain a battery charging current to be a trickle current when the battery voltage is less than the threshold voltage; and (iv) charging the battery directly by the output signal when the battery voltage is greater than the threshold voltage.

Figure 8:
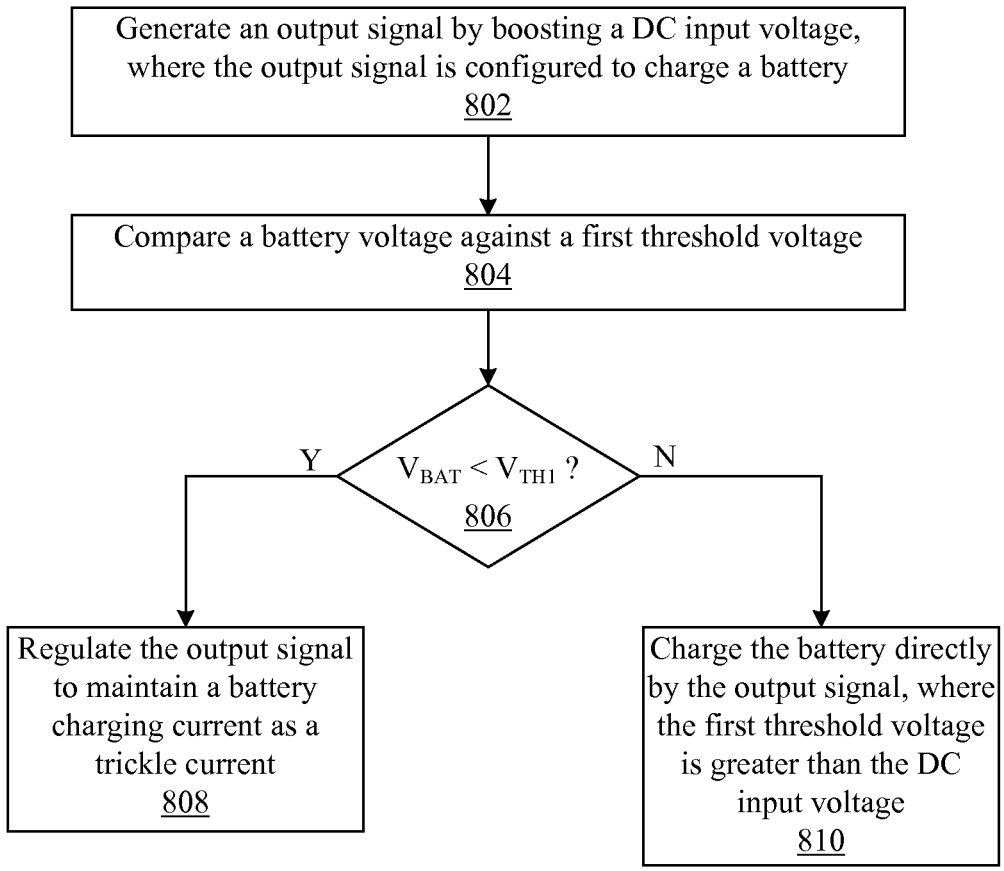
FIG. 8 is a flow diagram of an example method of controlling a step-up battery charger, in accordance with embodiments of the present invention.

Referring now to FIG. 8, shown is a flow diagram of an example control method for a step-up battery charger, in accordance with embodiments of the present invention. In particular embodiments, the output energy of a step-up converter can be controlled and utilized to charge a battery device. For example, at 802, an output signal can be generated (e.g., by a step-up converter) by boosting a DC input voltage. At 804, a battery voltage can be compared against a threshold value (e.g., $V_{TH1}$). If at 806, the battery voltage is less than the threshold voltage, at 808 the output signal from the step-up converter can be regulated (e.g., by charging control circuit 201) to maintain a battery charging current as a trickle current. However, if at 806, the battery voltage is greater than the threshold voltage, the battery device can be directly charged by the output signal from the step-up converter. For example, the threshold voltage can be greater than the DC input voltage.

Control of the battery charging current can also include connecting terminals of a power transistor (e.g., in charging control circuit 201) between the output of the step-up converter and the battery device, and regulating (e.g., via power transistor control circuit 301) the control voltage of the power transistor to operate in a linear region. This can effectively regulate the battery charging current to be a trickle current when the battery voltage is less than the threshold voltage. The power transistor (e.g., $Q_1$) may be controlled to be in a fully conducting state (e.g., a saturation mode) when the battery voltage is greater than the threshold voltage.

Control of the output signal of the step-up converter can also include maintaining an output voltage of the step-up converter to be a predetermined operating voltage when the battery voltage is less than the threshold voltage. For example, the predetermined operating voltage can be greater than the threshold voltage. The output current of the step-up converter can be maintained as the predetermined operating current when the battery voltage is greater than the threshold voltage, but less than a final voltage. Also, the output voltage of the step-up converter can be maintained as a final value when the battery voltage equals the final voltage, and the step-up converter may be disabled until the battery charging current is less than a shut-down current threshold value.

The example control method for the output signal of the step-up converter can also include generating a first feedback signal (e.g., $V_{C1}$) according to an error between the voltage value of the output signal and the predetermined operating voltage, generating a second feedback signal (e.g., $V_{C2}$) according to an error between the current value of the output signal and the predetermined operating current, generating a third feedback signal (e.g., $V_{C3}$) according to an error between the battery voltage and the final voltage, and controlling the switching operation (e.g., via the PWM control circuit) of the step-up converter according to the lowest one (e.g., via a select circuit) of the first, second, and third feedback signals.

Furthermore, the example control method can include selectively pulling up the first feedback signal or the second feedback signal according to a comparison result of the battery voltage against the threshold voltage. With a current limiting protection function, the control method can also include limiting the battery charging current when the DC input voltage is less than a current limiting threshold value such that the input current of the step-up converter is limited.

As part of a short-circuit protection function, the control method can also include controlling the battery charging current to be a predetermined current value when the battery voltage is less than a short-circuit protection threshold value, where the predetermined current value is less than the trickle current. Also, the battery charging current can be controlled to be a discontinuous current when an energy-consuming load is connected to the step-up converter instead of the battery device, and a load voltage is less than the threshold voltage. The maximum value of the battery charging current can also be greater than the corresponding current when the output signal is the threshold voltage.

In particular embodiments, the step-up converter can have any suitable converter topology (e.g., Boost, Buck-Boost, Sepic, Cuk, Zeta, etc.). Further, when the topology of the step-up converter is a synchronous rectifier boost converter, the synchronous switch can be controlled to be off when the battery charging current is less than the energy-saving mode current threshold value.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A battery charger, comprising:
   a) a step-up converter configured to generate an output signal by boosting a DC input voltage, wherein a threshold voltage is greater than said DC input voltage;
   b) a charging control circuit configured to receive said output signal from said step-up converter, and to control charging of a battery;
   c) said charging control circuit being configured to regulate said output signal by a power transistor operating in a linear region to maintain a charging current for said battery charging as a trickle current when a battery voltage is less than said threshold voltage, wherein said power transistor is coupled between said step-up converter and said battery; and
   d) said charging control circuit being configured to charge said battery directly by said output signal by said power transistor operating in a saturation region when said battery voltage is greater than said threshold voltage.

2. The battery charger of claim 1, wherein said power transistor
   c) comprises a parasitic diode having an anode coupled to said battery, and a cathode coupled to said step-up converter.

3. The battery charger of claim 1, wherein said step-up converter comprises:
   a) a power stage circuit having a switching operation controlled by a step-up converter control circuit to maintain said output signal to be substantially constant;
   b) said step-up converter control circuit being configured to maintain a voltage of said output signal to be a predetermined operating voltage when said battery voltage is less than said threshold voltage, wherein said predetermined operating voltage is greater than said threshold voltage;
   c) said step-up converter control circuit being configured to maintain a current of said output signal to be a predetermined operating current when said battery voltage is greater than said threshold voltage and less than a final voltage; and
   d) said step-up converter control circuit being configured to maintain said voltage of said output signal to be said final voltage when said battery voltage equals said final voltage and said battery charging current is not less than a shut-down current threshold, wherein said step-up converter is disabled when said battery charging current is less than said shut-down current threshold.

4. The battery charger of claim 3, wherein said step-up converter control circuit comprises:
   a) a first feedback circuit configured to generate a first feedback signal according to an error between said voltage of said output signal and said first operating voltage;
   b) a second feedback circuit configured to generate a second feedback signal according to an error between said current of said output signal and said first operating current;
   c) a third feedback circuit configured to generate a third feedback signal according to an error between said battery voltage and said final voltage;
   d) a selection circuit configured to output a lowest of said first, second, and third feedback signals; and
   e) a pulse-width modulation (PWM) control circuit configured to control said switching operation of said power stage circuit according to said output of said selection circuit.

5. The battery charger of claim 4, wherein said first and second feedback circuits are configured to receive a shield signal that selectively increase a value of said first feedback signal or said second feedback signal according to a comparison result of said battery voltage and said threshold voltage.

6. The battery charger of claim 1, further comprising a current-limiting protection circuit configured to limit said battery charging current to limit an input current of said step-up converter when said DC input voltage is less than a current limiting threshold.

7. The battery charger of claim 1, further comprising a short-circuit protection circuit configured to control said battery charging current to be a first current value that is less than said trickle current when said battery voltage is less than a short-circuit protection threshold value.

8. The battery charger of claim 7, wherein said short-circuit protection circuit is configured to control said battery charging current to be a discontinuous current, wherein a maximum value of said battery charging current is greater than a corresponding current when said output signal is said threshold voltage, when an energy-consuming load is connected to said step-up converter, and a load voltage is less than said threshold voltage.

9. The battery charger of claim 1, wherein a topology of said step-up converter comprises at least one of: Boost, Buck-Boost, Sepic, Cuk, and Zeta.

10. The battery charger of claim 1, further comprising an energy-saving control circuit when a topology of said step-up converter is configured as a synchronous rectifier boost converter, wherein said energy-saving control circuit is configured to control a synchronous switch to be off when said battery charging current is less than an energy-saving mode current threshold value.

11. A method of controlling charging of a battery, the method comprising:
   a) boosting, by a step-up converter, a DC input voltage to generate an output signal configured to charge a battery;

b) comparing, by a comparator, a battery voltage against a threshold voltage, wherein said threshold voltage is greater than said DC input voltage;

c) regulating, by a power transistor operating in a linear region, said output signal to maintain a battery charging current to be a trickle current when said battery voltage is less than said threshold voltage, wherein said power transistor is coupled between said step-up converter and said battery; and d) charging, by said power transistor operating in a saturation region, said battery directly by said output signal when said battery voltage is greater than said threshold voltage.

12. The method of claim 11, wherein comprises a parasitic diode having an anode coupled to said battery, and a cathode coupled to said step-up converter.

13. The method of claim 11, further comprising:

a) maintaining an output voltage of said step-up converter to be a predetermined operating voltage when said battery voltage is less than said threshold voltage, wherein said predetermined operating voltage is greater than said threshold voltage;

b) maintaining an output current of said step-up converter to be a predetermined operating current when said battery voltage is greater than said threshold voltage and less than a final voltage; and c) maintaining said output voltage of said step-up converter to be said final voltage when said battery voltage equals said final voltage and said battery charging current is not less than a shut-down current threshold, wherein said step-up converter is disabled when said battery charging current is less than a said shut-down current threshold.

14. The method of claim 13, further comprising:

a) generating a first feedback signal according to an error between a voltage value of said output signal and said predetermined operating voltage;

b) generating a second feedback signal according to an error between a current value of said output signal and said predetermined operating current;

c) generating a third feedback signal according to an error between said battery voltage and said final voltage;

d) controlling the switching operation of said step-up converter according to the lowest one of said first feedback signal, said second feedback signal, and said third feedback signal.

15. The method of claim 14, further comprising selectively increasing a value of said first feedback signal or said second feedback signal according to a comparison result of said battery voltage and said threshold voltage.

16. The method of claim 11, further comprising limiting said battery charging current when said DC input voltage is less than a current limiting threshold value in order to limit an input current of said step-up converter.

17. The method of claim 11, further comprising controlling said battery charging current to be a predetermined current value when said battery voltage is less than a short-circuit protection threshold value, wherein said predetermined current value is less than said trickle current.

18. The method of claim 11, further comprising controlling said battery charging current to be a discontinuous current when an energy-consuming load is coupled to said step-up converter instead of said battery and a load voltage is less than said threshold voltage, wherein a maximum value of said battery charging current is greater than a corresponding current when said output signal is equal to said threshold voltage.

19. The method of claim 11, wherein a topology of said step-up converter comprises at least one of: Boost, Buck-Boost, Sepic, Cuk, and Zeta.

20. The method of claim 11, further comprising controlling a synchronous switch to be off when said battery charging current is less than an energy-saving mode current threshold value.

* * * * *